Patented Apr. 3, 1928.

1,665,005

UNITED STATES PATENT OFFICE.

HENRY J. WEILAND AND IVAN GUBELMANN, OF SOUTH MILWAUKEE, WISCONSIN, ASSIGNORS TO THE NEWPORT COMPANY, OF CARROLLVILLE, WISCONSIN, A CORPORATION OF DELAWARE.

METHOD FOR THE SEPARATION OF M-DINITROBENZENE FROM ITS ISOMERS.

No Drawing.   Application filed August 19, 1926. Serial No. 130,356.

This invention relates to a method for the separation of m-dinitrobenzene from its isomers and to a method for the production of m-dinitrobenzene of a high state of purity.

In the dinitration of benzene, there is always formed, in addition to m-dinitrobenzene, appreciable quantities of isomeric dinitrobenzenes. Up to the present time, no process has been devised, to the best of our knowledge, to prevent the formation of the other isomeric dinitrobenzenes. In fact, technical m-dinitrobenzene, as shown by our analyses, always contains approximately 6 to 10% of the isomeric forms.

It is, therefore, an object of our invention to provide a method for separating m-dinitrobenzene from its isomers and to obtain thereby a technical product of high degree of purity.

It is a further object of our invention to provide a commercially practicable method for obtaining m-dinitrobenzene in a state of purity closely approximating the chemically pure substance.

Other and further important objects of this invention will become apparent from the disclosures in the specification and the appended claims.

We have found that by treating pure m-dinitrobenzene with less than a 10% caustic soda solution preferably about a 5% caustic solution, at a temperature above 80° C., there is practically no decomposition of the m-dinitrobenzene. In separating m-dinitrobenzene from a mixture containing the isomeric dinitrobenzenes, we take advantage of this fact and of the further fact that under these conditions the two isomeric forms present in the crude are attacked by the alkali and are converted into salt-forming bodies, such as the ortho and para nitro phenols, that may be washed away from the m-dinitrobenzene with water. It is obvious that any alkali giving an alkalinity equivalent to a 10% caustic soda solution or less will give equally satisfactory results. In place of caustic soda any alkali forming substance, such as ammonium hydroxide, potassium hydroxide or carbonate, sodium carbonate or the like may be used. It is further apparent that the strength of the alkali used need not be limited to 10% but may include any strength of alkali which will react on the ortho- and para- isomers and leave the meta-dinitrobenzene unattacked. The ortho-nitro phenol, which is present in largest amount in the alkaline wash liquors, may be recovered by acidifying, followed by steam distillation.

By carrying out the process as above described, we are able to obtain practically a quantitive yield of the m-dinitrobenzene, based upon the quantity of the meta-isomer known to exist in the crude m-dinitrobenzene. The crystallizing point on the thus separated m-dinitrobenzene was found to be 84.7° C. (wet) and 89.0° C. (dry), as compared with that found on chemically pure m-dinitro-benzene which was 84.97° C. (wet) and 89.2° C. (dry).

Without limiting our invention to any particular procedure, the following example, in which parts by weight, except as otherwise stated, are given, illustrates the application of our invention in the preferred form:

5000 parts of technical m-dinitrobenzene having a crystallizing point wet of 79° C. and dry of 83.25° C. are melted up with 5000 parts of hot water. While maintaining the temperature of the mix at 85 to 90° C. under agitation, there are added over a period of one hour 500 parts by volume of 40° Bé. caustic soda solution. The temperature is held at 85°–90° for four hours longer, at the end of which time an additional 350 parts by volume of 40° Bé. caustic soda solution are gradually added over a period of six hours. From the time of the addition of the first quantity of caustic solution, the temperature of the mix is held at 85°–90° C. under agitation for a total of twenty-four hours. The mass is then cooled down to 50° C. under agitation and washed by draining until the wash waters are only faintly colored. The m-dinitrobenzene, which remains unchanged during the above process, is then filtered off on a suction filter and later air-dried at 50°–70° C.

The yield obtained is practically quantitive and the crystallizing point is 84.7° C. (wet) and 89° C. (dry).

It is thus seen that we have provided a simple and efficient process that may be worked on a commercial scale for the separation of m-dinitrobenzene from its isomers in a state of purity heretofore found only in the chemically pure product obtained by methods not adapted to commercial operation. The significance of this fact will be appreciated by those familiar with the art.

We are aware that numerous details of the process may be varied through a wide range without departing from the principles of this invention, and we do not desire limiting the patent granted otherwise than as necessitated by the prior art.

We claim as our invention:

1. The method of purifying technical m-dinitrobenzene containing other isomers, which comprises treating the technical m-dinitrobenzene with an alkali forming substance in water solution adapted to convert the other isomeric dinitrobenzenes into water-soluble bodies without decomposing the m-dinitrobenzene and separating the unchanged m-dinitrobenzene.

2. The method of purifying technical m-dinitrobenzene containing other isomers, which comprises treating the technical m-dinitrobenzene at an elevated temperature with an alkali forming substance in water solution adapted to convert the other isomeric dinitrobenzenes into water-soluble bodies without decomposing the m-dinitrobenzene, cooling, and separating the unchanged m-dinitrobenzene.

3. The method of purifying technical m-dinitrobenzene containing other isomers, which comprises treating the crude m-dinitrobenzene with caustic alkali in sufficient quantity to convert the other isomeric dinitrobenzenes into water-soluble bodies without decomposing the m-dinitrobenzene and separating the unchanged m-dinitrobenzene.

4. The method of separating m-dinitrobenzene from a mixture of its isomers, which comprises treating the mixture with a caustic alkali solution of less than 10% strength, whereby the isomeric dinitrobenzenes are converted into water-soluble bodies, and separating the water solution of these bodies from the m-dinitrobenzene.

5. The method of separating m-dinitrobenzene from a mixture of its isomers, which comprises treating the mixture with a 5% caustic alkali solution, whereby the isomeric dinitrobenzenes are converted into water-soluble bodies, and separating the water solution of these bodies from the m-dinitrobenzene.

6. The method of separating m-dinitrobenzene from a mixture of its isomers, which comprises treating the mixture with a caustic alkali solution of less than 10% strength, while maintaining the mixture at an elevated temperature, whereby the isomeric dinitrobenzenes are converted into water-soluble bodies, and separating the water solution of these bodies from the m-dinitrobenzene.

7. The method of separating m-dinitrobenzene from a mixture of its isomers, which comprises treating the mixture under agitation with a less than 10% solution of caustic alkali at a temperature of approximately 85° to 90° C. for a prolonged period of time, cooling, washing and filtering off the unchanged m-dinitrobenzene.

In testimony whereof we have hereunto subscribed our names.

HENRY J. WEILAND.
IVAN GUBELMANN.